(12) United States Patent
Sakata et al.

(10) Patent No.: US 7,359,314 B2
(45) Date of Patent: Apr. 15, 2008

(54) SIGNAL TRANSMISSION SYSTEM FOR TRANSMITTING A SIGNAL WITH A GUARD INTERVAL AND A DEMODULATION METHOD THEREOF

(75) Inventors: Satoshi Sakata, Tokyo (JP); Nobuo Tsukamoto, Akishima (JP)

(73) Assignee: Hitachi, Ltd., Tokyo (JP)

( * ) Notice: Subject to any disclaimer, the term of this patent is extended or adjusted under 35 U.S.C. 154(b) by 979 days.

(21) Appl. No.: 10/327,913

(22) Filed: Dec. 26, 2002

(65) Prior Publication Data

US 2003/0117943 A1 Jun. 26, 2003

(30) Foreign Application Priority Data

Dec. 26, 2001 (JP) ............................. 2001-395368

(51) Int. Cl.
*H04J 11/00* (2006.01)
(52) U.S. Cl. ........................ 370/210; 370/208; 375/362
(58) Field of Classification Search ................ 370/203, 370/344, 210, 208; 375/316, 260, 232, 146, 375/355, 354
See application file for complete search history.

(56) References Cited

U.S. PATENT DOCUMENTS

| 5,602,835 | A  |   | 2/1997  | Seki et al.                     |
|-----------|----|---|---------|---------------------------------|
| 6,009,073 | A  | * | 12/1999 | Kaneko .................. 370/203 |
| 6,246,735 | B1 | * | 6/2001  | Sano et al. .............. 375/364 |
| 6,304,611 | B1 | * | 10/2001 | Miyashita et al. .......... 375/260 |
| 6,359,938 | B1 | * | 3/2002  | Keevill et al. ............ 375/316 |
| 6,381,251 | B1 | * | 4/2002  | Sano et al. .............. 370/480 |
| 6,449,245 | B1 | * | 9/2002  | Ikeda et al. ............. 370/208 |
| 6,539,065 | B1 | * | 3/2003  | Furukawa ................ 375/316 |
| 6,608,863 | B1 | * | 8/2003  | Onizawa et al. ........... 375/232 |
| 6,611,493 | B1 | * | 8/2003  | Miyashita et al. .......... 370/208 |

(Continued)

OTHER PUBLICATIONS

Enhanced symbol synchronization method for OFDM system in SFN channels Palin, A.; Rinne, J.; Global Telecommunications Conference, 1998. GLOBECOM 98. The Bridge to Global Integration. IEEE vol. 5, Nov. 8-12, 1998 pp. 2788-2793 vol. 5.*

(Continued)

*Primary Examiner*—Thong Vu
(74) *Attorney, Agent, or Firm*—Mattingly, Stanger, Malur & Brundidge, P.C.

(57) ABSTRACT

Difference between a received signal which is an OFDM modulated signal having a guard interval and a delayed signal acquired by delaying the received signal by time equivalent to a data interval is calculated, a reference signal of an FFT calculation window is generated based upon the acquired result of the calculation of the difference and a predetermined threshold and a boundary between symbols is detected. As a result, the boundary between symbols can be stably detected, compared with a method of detecting a boundary between symbols based upon the result of the correlation calculation of the guard interval and the demodulation of received data is also stably enabled in multipath phasing and ghost.

20 Claims, 13 Drawing Sheets

U.S. PATENT DOCUMENTS

| | | | |
|---|---|---|---|
| 6,658,063 B1* | 12/2003 | Mizoguchi et al. | 375/260 |
| 6,813,326 B1* | 11/2004 | Miyashita et al. | 375/362 |
| 6,853,616 B1* | 2/2005 | Kim et al. | 370/210 |
| 6,928,048 B1* | 8/2005 | Do et al. | 370/208 |
| 6,968,017 B2* | 11/2005 | Nielsen | 375/316 |
| 7,058,002 B1* | 6/2006 | Kumagai et al. | 370/203 |
| 7,106,817 B2* | 9/2006 | Matsugatani et al. | 375/354 |
| 7,110,387 B1* | 9/2006 | Kim et al. | 370/344 |
| 7,149,266 B1* | 12/2006 | Imamura et al. | 375/355 |
| 2003/0058951 A1* | 3/2003 | Thomson et al. | 375/260 |
| 2004/0141548 A1* | 7/2004 | Shattil | 375/146 |

OTHER PUBLICATIONS

Complexity evaluation for the implementation of a pre-FFT equalizer in an OFDM receiver Armour, S.; Nix, A.; Bull, D.; Consumer Electronics, IEEE Transactions on vol. 46, Issue 3, Aug. 2000 pp. 428-437.*

Transmitter diversity for OFDM systems and its impact on high-rate data wireless networks Ye Li; Chuang, J.C.; Sollenberger, N.R.; Selected Areas in Communications, IEEE Journal on vol. 17, Issue 7, Jul. 1999 pp. 1233-1243.*

* cited by examiner

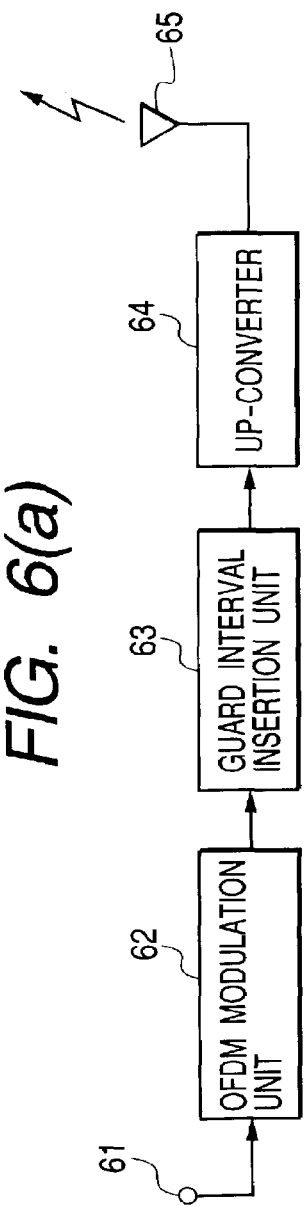
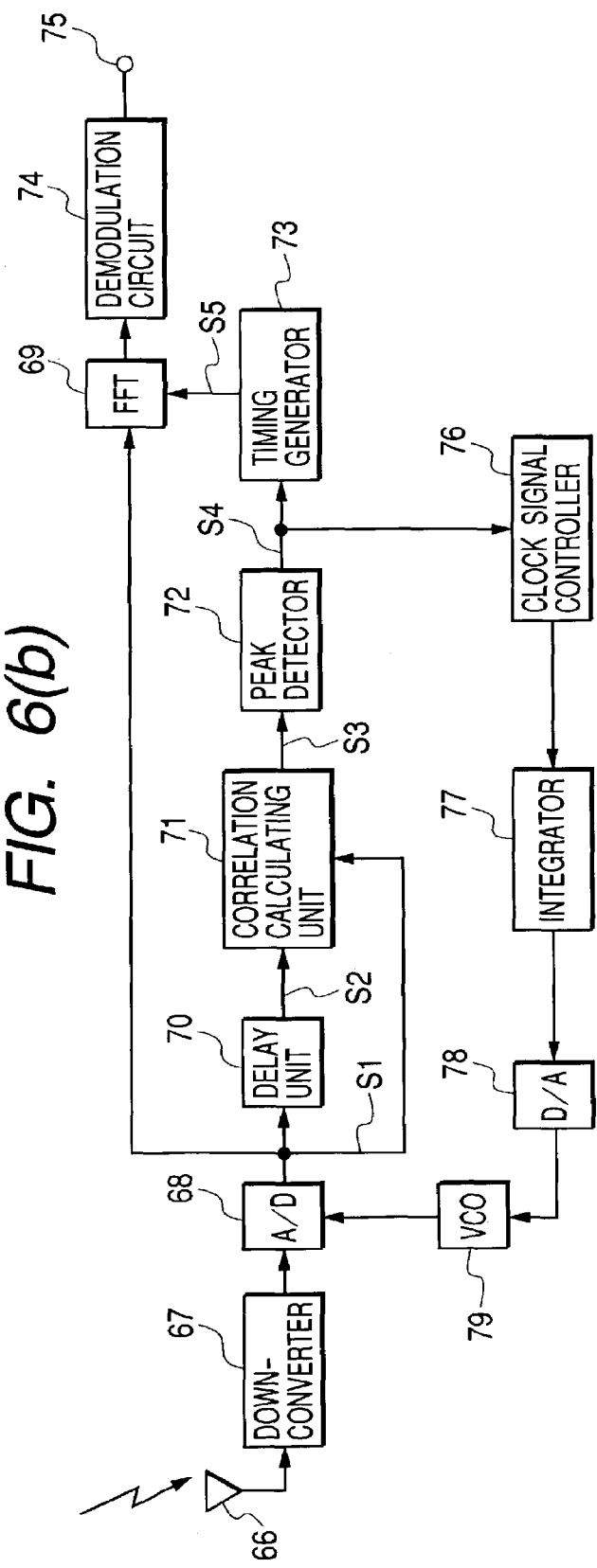
FIG. 6(a)
FIG. 6(b)

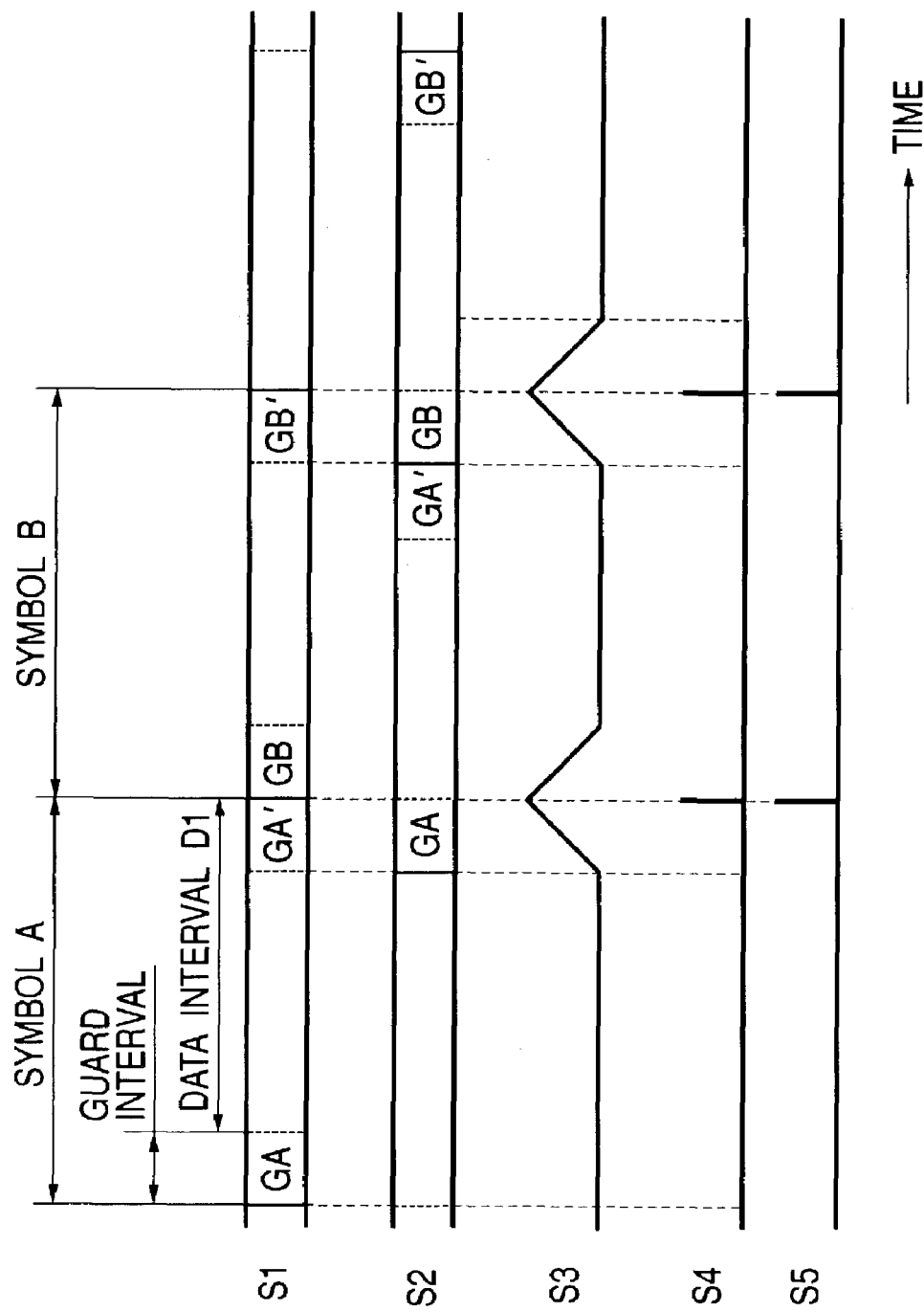

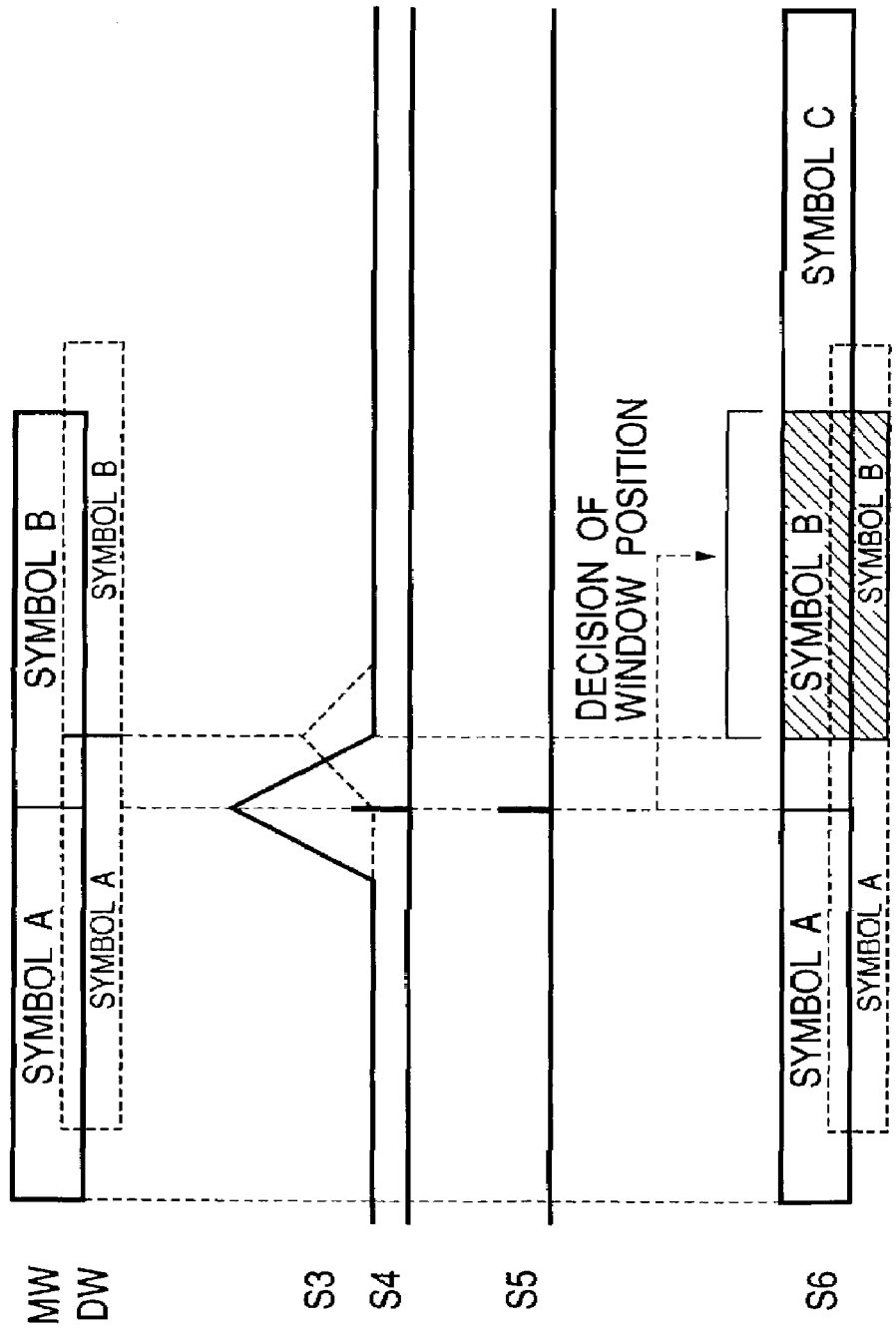

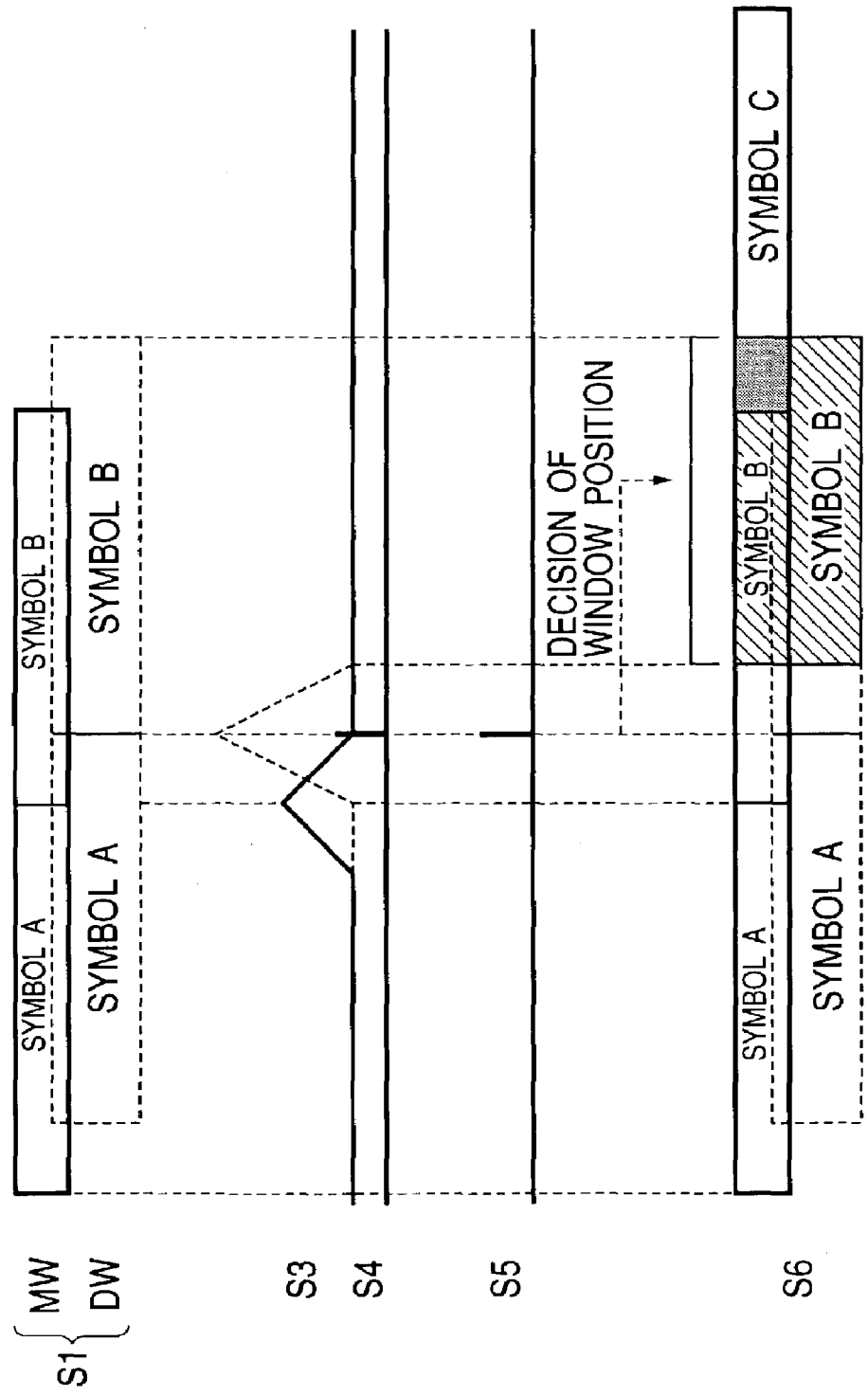

SIGNAL TRANSMISSION SYSTEM FOR TRANSMITTING A SIGNAL WITH A GUARD INTERVAL AND A DEMODULATION METHOD THEREOF

BACKGROUND OF THE INVENTION

The present invention relates to an orthogonal frequency division multiplexing (OFDM) modulating signal transmission system, particularly relates to the regeneration of a symbol synchronizing signal when a received signal is demodulated.

Recently, for modulation technique suitable for digital transmission for a mobile body and ground wave digital television broadcasting, an OFDM modulated signal transmission system attracts attention. The OFDM modulated signal transmission system is characterized in that it is strong concerning multipath phasing and ghost.

The OFDM modulated signal transmission system is a system for modulating multiple carriers arranged at an interval of the same frequency fs to digital carriers by the same symbolic frequency and transmitting an information code. FIG. 13 shows one example. The y-axis in FIG. 13 shows the power of a carrier, the x-axis shows a frequency and bandwidth Bw is 17 MHz. In the bandwidth Bw, for example, approximately 800 carriers are arranged at an interval of 20 kHz. For the digital modulation technique of a carrier, differential quadrature phase shift keying is often used, however, many-valued modulation technique such as 16 quadrature amplitude modulation (QAM) and 64 QAM can be also used.

In the OFDM modulated signal transmission system, a predetermined amount of data to be transmitted is divided into 800 pieces for example and 800 carriers Cf1, Cf2, - - - Cfn are modulated by the divided data. At this time, a transmission signal transmitted from a transmitting apparatus is a signal shown in FIG. 14. That is, the transmission signal is a signal in which a symbol A, a symbol B, - - - are repeated as shown in FIG. 14, wherein a term of the symbol B is equal to a term of the symbol A. In one symbol, 800 carriers are multiplexed so that they are kept mutually orthogonal to be an OFDM modulated signal. The predetermined amount of data to be transmitted is transmitted in the form of the OFDM modulated signal. A first symbol A (50 μsec) is composed of a guard interval GI and a data interval DI. To explain further in detail, for example, the first symbol A includes 1152 samples, the data interval DI includes 1024 samples and the guard interval GI includes 128 samples. A guard interval GA (the same as GI) is an interval in which a part GA' of the data interval DI is copied. Therefore, GA and GA' are configured by the same signal. The data interval DI is also called an effective symbol. When the first symbol is not required to be particularly differentiated, it is called the symbol A.

In case the transmission signal transmitted in the form of the OFDM modulated signal as described above is demodulated, a reference signal $S_0$ showing the boundary position of a symbol of the received signal shown in FIG. 14 is required to be regenerated in a receiving apparatus.

First, referring to FIGS. 6 and 7, an example that the reference signal $S_0$ is regenerated based upon a digital received signal S1 of a conventional type will be described. FIG. 6 are block diagrams showing the schematic configuration of a transmitting apparatus-receiving apparatus according to the OFDM modulated signal transmission mode and FIG. 7 shows the operational waveforms for explaining the operation of a receiving apparatus.

As shown in FIG. 6(a), transmission data applied to an input terminal 61 is converted to an OFDM modulated signal as described in relation to FIGS. 13 and 14 in an OFDM modulation unit 62 of a transmitting apparatus and a guard interval is added in a guard interval additional unit 63 to be a signal SY shown in FIG. 14. The frequency of the signal SY is converted in an up-converter 64 and the signal is transmitted via an antenna 65 as a high-frequency transmission signal.

Next, referring to FIG. 6(b), the receiving apparatus will be described. A received signal SY received via an antenna 66 is converted to a base band signal in a down-converter 67 of the receiving apparatus and is input to an A/D converter 68. From the A/D converter 68, a digital received signal S1 shown in FIG. 7 is acquired. The signal has the same configuration as the signal SY shown in FIG. 14. The digital received signal S1 is applied to a Fourier fast transformation (hereinafter abbreviated as FFT) calculating unit 69.

In the meantime, the digital received signal S1 is supplied to a delay unit 70 and a correlation calculating unit 71. In the delay unit 70, the digital received signal S1 is delayed by time equivalent to a data interval DI to a digital signal S2 and is applied to the correlation calculating unit 71. In the correlation calculating unit 71, correlation between the digital received signal S1 and the delayed digital received signal S2 is calculated.

As the digital signal S1 and the delayed signal S2 are the same signal as described above, correlation output S3 shown in FIG. 7 is acquired for the output of the correlation calculating unit 71. The reason why the correlation output S3 is a triangular waveform as shown in FIG. 7 is that data having length equivalent to the guard interval GI is fetched, being sequentially shifted in a direction of a time base and correlation between the digital received signal S1 and the delayed digital signal S2 is calculated in the correlation calculating unit 71.

The correlation signal S3 is output to a peak detector 72, the position of a peak is detected and a correlation peak position signal S4 is output. The correlation peak position signal S4 is output to a timing generator 73. In the timing generator 73, a reference signal S5 showing a boundary position of a symbol (equivalent to $S_0$ in FIG. 14) is generated based upon the correlation peak position signal S4 and is applied to the FFT calculating unit 69. The reference signal S5 controls the timing of the digital received signal S1 applied to the FFT calculating unit 69 and the output is applied to a demodulating circuit 74. As a result, the digital received signal S1 is correctly demodulated based upon the reference signal S5. The demodulated digital signal is output from an output terminal 75, in case the signal processing of a picture signal for example is required, required picture signal processing is executed and an image is displayed on a monitor (not shown) and others. It need scarcely be said that an image may be also recorded except a monitor or can be transmitted to another place via a transmission line. The correlation peak position signal S4 is further applied to the A/D converter 68 via a clock signal controller 76, an integrator 77, a D/A converter 78 and a voltage controlled oscillator (VCO) 79 to execute symbol synchronous control.

A case that the OFDM modulated signal is transmitted from the transmitting apparatus to the receiving apparatus via a transmission line includes a case that the transmission signal is transmitted by a so-called direct wave (also called a main wave) directly incoming to the receiving apparatus from the transmission and a case that the transmission signal is transmitted by a so-called delayed wave (also called a reflection wave) that the transmission signal is transmitted, being reflected on various things from the transmitting apparatus depending upon a situation of the transmission line, and a transmission signal is normally propagated in a state in which a main wave and a delayed wave are mixed. This is generally called multipath propagation. In such multipath propagation, when the desired to undesired ratio (D/U) of the conventional type described above is −20 dB or less for example, the receive level of a reflection wave becomes higher than that of a main wave. Therefore, the correlation peak position of a reflection wave the receive level of which is higher than the correlation peak position of a main wave is detected. As a result, a problem that the data fetch interval (hereinafter called a FFT window position) of the FFT calculating unit 69 varies, a correct symbol position cannot be detected and the digital received signal S1 cannot be correctly demodulated occurs.

The problem of the conventional type will be described further in detail below. First, the OFDM modulated signal has the guard interval GA in which a part of the data interval DI is copied and added as described above. Hereby, in the case of delay in the guard interval even if multipaths occur and a reflection wave is received, so-called interference between symbols in which each one part of the data of the symbol A and the data of the symbol B is overlapped can be avoided. Therefore, the longer the guard interval GA is, the more resistant the signal is to a reflection wave. However, as a symbol interval is fixed, the data interval DI is shortened when the guard interval GA is extended and the transmission efficiency of data is deteriorated.

Next, symbol synchronization in multipath propagation will be examined. FIG. 8 shows operational waveforms in case the receive level of a main wave MW is higher than that of a reflection wave DW. As shown in FIG. 8, the OFDM modulated signal is received as a digital signal S1 in which a main wave MW shown by a full line and a reflection wave DW shown by a broken line are synthesized. The area of each symbol shown in FIG. 8 shows the magnitude of each receive level.

The correlation of the digital received signal S1 is calculated in the correlation calculating unit 71 as described in relation to FIG. 6(b). For the output of the correlation calculating unit 71, correlation output S3 shown in FIG. 8 is output. The correlation output S3 in this case has two correlation peaks, one of which is a waveform having a first peak in the symbol boundary position of the main wave MW of correlation output, and the other one of which is a waveform having a second peak (shown by a dotted line in FIG. 8) in the symbol boundary position of the reflection wave DW of correlation output.

When the correlation output S3 is applied to the peak detector 72, the higher peak of the two correlation peaks, that is, a correlation peak position signal S4 of the main wave MW is detected. A reference signal S5 of a symbol is generated based upon the correlation peak position signal S4 of the main wave MW in the timing generator 73 and is applied to the FFT calculating unit 69.

In the FFT calculating unit 69, an FFT window position is decided based upon the reference signal S5. That is, as shown in a signal S6 in FIG. 8, an FFT window position (shown by a diagonal line in FIG. 8) to fetch data is located in a position off the reference signal S5 by a guard interval and in addition, the size of the window is equivalent to the data interval DI (an effective symbol interval). Even if the reflection wave DW is received and two peaks emerge in the correlation output S3 as described above, no problem is particularly caused in the generation of the reference signal S5 if the first peak which is the receive level of the main wave MW is higher.

However, in case a transmitting apparatus is mounted in a mobile body, for example, in case a sport such as marathon is relayed, moving, a situation of a propagation path greatly changes and multipath propagation may occur. In such a situation, the receive level of a main wave MW and the receive level of a reflection wave DW greatly change and for a digital received signal S1, a signal in which the main wave MW and the reflection wave DW are mixed is received, however, as shown in FIG. 9, a case that the receive level of a main wave MW is lower than that of a reflection wave DW may occur. That is, the case is reverse to the case shown in FIG. 8. In this case, in a correlation signal S3, a peak of the correlation output (shown by a dotted line) of the reflection wave DW is higher than a peak of the correlation output of the main wave MW as shown in FIG. 9. Therefore, when the correlation signal S3 is applied to the peak detector 72 shown in FIG. 6(b), a correlation peak position signal S4 of the reflection wave DW shown in FIG. 9 is detected for a peak position detection signal S4 and a reference signal S5 is generated.

Therefore, when an FFT window position is decided based upon the reference signal S5, a hatched part is incorporated in the demodulating circuit 74 as data used for demodulation as shown in S6 in FIG. 9. In this case, a part (shown by half-tone dot meshing) of a symbol C is incorporated in the demodulation data of a symbol B and interference is caused between the symbol B and the symbol C. As a result, a problem that the error rate of the demodulation data increases occurs. The interference between the symbol B and the symbol C is described above, however, it need scarcely be said that interference between a symbol A and the symbol B is also similar.

To reduce the generation of interference between symbols, there is a method of shifting an FFT window position by M pieces of samples from the boundary of the symbol and giving clearance. An FFT window position shown in S6 in FIG. 9 is shifted in a direction of the symbol A by giving clearance as described above. Hereby, dangerousness that data in the symbol C is incorporated is reduced. However, a problem that the guard interval GI is shortened by clearance by giving the clearance equivalent to M pieces of samples and resistance to a reflection wave delayed long is reduced occurs. A value of M described above is determined based upon experiments.

Further, FIG. 10 shows a received signal in case a reflection wave (called a preceding wave PW) preceding a main wave MW and a delayed reflection wave DW are caused. A received digital signal S1 is a digital signal in which the main wave MW, the preceding wave PW preceding the main wave MW and the reflection wave DW are mixed as shown in FIG. 10. The correlation calculating unit 71 calculates correlation between the digital received signal S1 and a digital signal S2 delayed by an effective symbol interval. To simplify the explanation, when it is supposed that the correlation waveform of a preceding wave PW, a main wave MW and a reflection wave DW can be individually acquired, correlation output S3 shown in FIG. 10, that is, correlation waveforms S3-1, S3-2 and S3-3 are acquired. The waveform of the correlation output S3 has such a shape that three triangles are arranged and the peaks of correlation output signals S3 are substantially equal.

In such a case, when time $t_0$ showing the peak position of a first correlation waveform S3-1 of the correlation output signals S3 shown in FIG. 10 is supposed to be a starting point of an FFT window position, no problem is caused in demodulation because only a signal in a symbol A is used for demodulation data. However, an actual correlation waveform is a waveform in which three triangles of the correlation output signals S3 are synthesized as shown by a correlation waveform S7 in FIG. 10. As a result, it becomes difficult to detect the position of the time $t_0$. The correlation waveform S3-1 of the preceding wave PW shown in FIG. 10 is drawn like it is the received waveform of a signal having the same receive level as the main wave MW, however, in case the receive level of the preceding wave is low, the waveform of the preceding wave is buried under the correlation waveform of the main wave and the position of the time $t_0$ cannot be specified. As described above, when the position of the time $t_0$ cannot be precisely detected and the FFT window position tries to be determined based upon the peak of the correlation waveform, a received signal in which interference between symbols is caused is incorporated in the FFT calculating unit 69 as demodulation data and the error rate of the demodulation data increases.

There is a method of shifting an FFT window position by M pieces of samples from a boundary between symbols and giving clearance as described above to reduce the generation of interference between symbols. As the FFT window position shown in FIG. 10 is shifted in a direction of the symbol A in this method, clearance can be given to the incorporation of data. Hereby, dangerousness that data in a symbol B is incorporated in the FFT calculating unit 69 decreases. However, a problem that a guard interval is shortened by the clearance by giving the clearance equivalent to M pieces of samples and resistance to a reflection wave delayed long is reduced occurs.

SUMMARY OF THE INVENTION

The object of the present invention is to provided a demodulator of a transmission signal, a signal transmission system and a method of demodulating a transmission signal in which the transmission signal having a guard interval can be correctly regenerated.

Another object of the present invention is to provide a signal transmission system in which a boundary between transmission symbols can be also precisely detected in multipath propagation.

Another object of the present invention is to provide a signal transmission system in which a boundary between transmission symbols is also precisely detected in multipath propagation and precise demodulation data can be incorporated.

Another object of the present invention is to provide a signal transmission system in which a boundary between transmission symbols is also precisely detected in different modulation technique and transmitted data can be demodulated.

Further another object of the present invention is to provide a signal transmission system in which an OFDM modulated signal can be also correctly demodulated in multipath propagation.

To achieve the above objects, a demodulation method for demodulating a transmission signal having a guard interval and a data interval according to the present invention comprises a step for receiving the transmission signal, a step for delaying the received signal by the data interval, a step for calculating difference between the received signal and the delayed signal, a step for detecting the reference position of the guard interval based upon the result of the calculation of the difference and a step for demodulating the received signal based upon the reference position information of the guard interval.

In the present invention, the transmission signal is made by the repetition of a symbol composed of the guard interval and the data interval and the step for detecting the reference position of the guard interval is composed of a step for generating a predetermined threshold and a step for generating a reference signal corresponding to a starting point for incorporating data to be demodulated based upon the result of the calculation of the difference and the threshold.

The demodulation method according to the present invention further comprises a step for setting a type of the modulation of the transmission signal and the threshold is controlled based upon the modulation type.

The threshold in the present invention is set to a value according to at least either of modulation technique used for the transmission signal or an error correction method.

The threshold in the present invention is set to a value calculated based upon the received signal.

Further, in the present invention, the step for demodulating the received signal is provided with an FFT calculation window for incorporating the received signal in a predetermined interval and the position of the FFT calculation window is controlled based upon the reference position information of the guard interval.

The transmission signal in the present invention includes a main wave and a reflection wave, and if the reference position of the FFT calculation window detected in the preceding symbol is W, a lag between the reference position W and the reference position of the main wave detected in the current symbol is m, the frequency of the detection of the reflection wave is n and a constant of the control of the FFT calculation window position is K, the FFT window position is controlled so that the reference position W' of the current symbol is "W+m" when the main wave is detected and the FFT window position is controlled so that the reference position W' of the current symbol is "W−n/K" when the reflection wave is detected.

A received signal used in the present invention may be an OFDM modulated signal.

Further, to achieve the objects, a receiving apparatus of the present invention for receiving a transmission signal having a guard interval and a data interval is provided with a unit that receives the transmission signal, a delay unit that delays the signal from the receiving unit by the data interval, a differential value calculating unit that calculates difference between the signal from the received unit and a signal from the delay unit, a guard interval reference position detecting unit that detects the reference position of the guard interval based upon the result of the calculation of the difference and a demodulating unit that demodulates the received signal based upon the reference position information of the guard interval.

The transmission signal used in the present invention is made by the repetition of a symbol composed of a guard interval and a data interval and the guard interval reference position detecting unit is composed of a threshold generator that generates a predetermined threshold and a reference signal generator that generates a reference signal corresponding to a starting point of the incorporation of data to be demodulated based upon the result of the calculation of the difference and the threshold.

The receiving apparatus in the present invention is also provided with a setting unit for setting a type of the modulation of the transmission signal and the threshold is controlled based upon the output of the modulation type setting unit.

The output of the modulation type setting unit in the present invention is output according to at least either of modulation technique used for the transmission signal or an error correction method.

The received signal in the present invention is applied to the threshold generator, the threshold generator calculates based upon the received signal and generates a threshold.

The modulating unit in the present invention is provided with an FFT calculation window generator for incorporating the received signal in a predetermined interval and controls the position of the FFT calculation window generated based upon the reference position information of the guard interval by the FFT calculation window generator.

Further, in the receiving apparatus according to the present invention, the transmission signal includes a main wave and a reflection wave and the FFT calculation window generator is designed as follows. If the reference position of the FFT calculation window detected in the preceding symbol is W, lag between the reference position W and the reference position of the main wave detected in the current symbol is m, the frequency of the detection of the reflection wave is n and a constant of the control of the FFT calculation window position is K, the FFT window position is controlled so that the reference position W' of the current symbol is "W+m" when the main wave is detected and the FFT window position is controlled so that the reference position W' of the current symbol is "W−n/K" when the reflection wave is detected.

Furthermore, to achieve the objects, a signal transmission system having a transmitting apparatus and a receiving apparatus according to the present invention is characterized in that the transmitting apparatus for transmitting a transmission signal made by the repetition of a guard interval and a data interval is provided with a modulating unit for modulating the transmission signal according to predetermined modulation technique, a guard interval insertion unit for inserting a guard interval into a modulated signal from the modulating unit and generating a transmission signal made by the repetition of the guard interval and the data interval and an antenna for transmitting the output of the guard interval insertion unit and the receiving apparatus is provided with a unit for receiving the transmission signal, a delay unit for delaying the signal from the receiving unit by the data interval, a differential value calculating unit for calculating difference between the signal from the receiving unit and a signal from the delay unit, a guard interval reference position detecting unit for detecting the reference position of the guard interval based upon the result of the calculation of the difference and a demodulating unit for demodulating the received signal based upon the reference position information of the guard interval.

The guard interval reference position detecting unit of the signal transmission system in the present invention is composed of a threshold generator for generating a predetermined threshold and a reference signal generator for generating a reference signal corresponding to a starting point of the incorporation of data to be demodulated based upon the result of the calculation of the difference and the threshold.

The signal transmission system in the present invention is also provided with a setting unit for setting a type of the modulation of the transmission signal and the threshold is controlled based upon the output of the modulation type setting unit.

The output of the modulation type setting unit of the signal transmission system in the present invention is output according to at least either of modulation technique used for the transmission signal or an error correction method.

The received signal used in the present invention is applied to the threshold generator of the signal transmission system, the threshold generator calculates based upon the received signal and generates a threshold.

Furthermore, the demodulating unit of the signal transmission system in the present invention is provided with an FFT calculation window generator for incorporating the received signal in a predetermined interval and controls the position of the FFT calculation window generated based upon the reference position information of the guard interval by the FFT calculation window generator.

The transmission signal used in the signal transmission system in the present invention may be an OFDM modulated signal.

The above and other objects, features and advantages of the present invention will be apparent from the following detailed description of illustrative embodiments which is to be read in connection with the accompanying drawings.

BRIEF DESCRIPTION OF THE DRAWINGS

FIG. 6(a) is a block diagram showing one example of a transmitting apparatus according to a conventional type OFDM signal transmission mode and FIG. 6(b) is a block diagram showing one example of a receiving apparatus according to the conventional type OFDM signal transmission mode;

FIG. 7 is an explanatory drawing for explaining the operation of the conventional type shown in FIG. 6(b);

FIG. 8 is an explanatory drawing for explaining the operation of the conventional type in case the receive level of a main wave is higher than that of a reflection wave;

FIG. 9 is an explanatory drawing for explaining the operation of the conventional type in case the receive level of the main wave is lower than that of the reflection wave;

DETAILED DESCRIPTION OF THE ILLUSTRATED EMBODIMENTS

Figure 1:
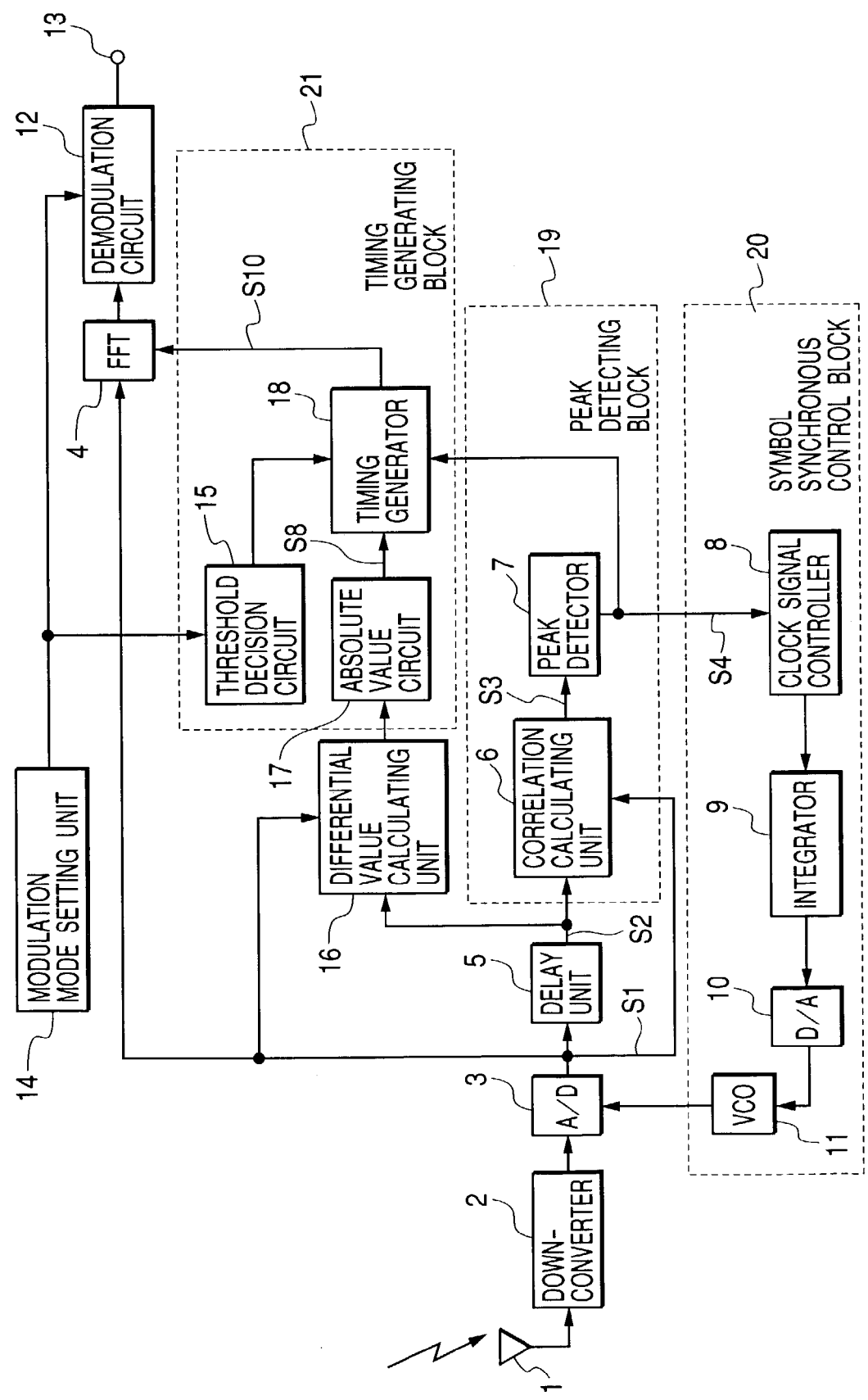
FIG. 1 is a block diagram showing the schematic configuration of one embodiment of the present invention.
Figure 4:
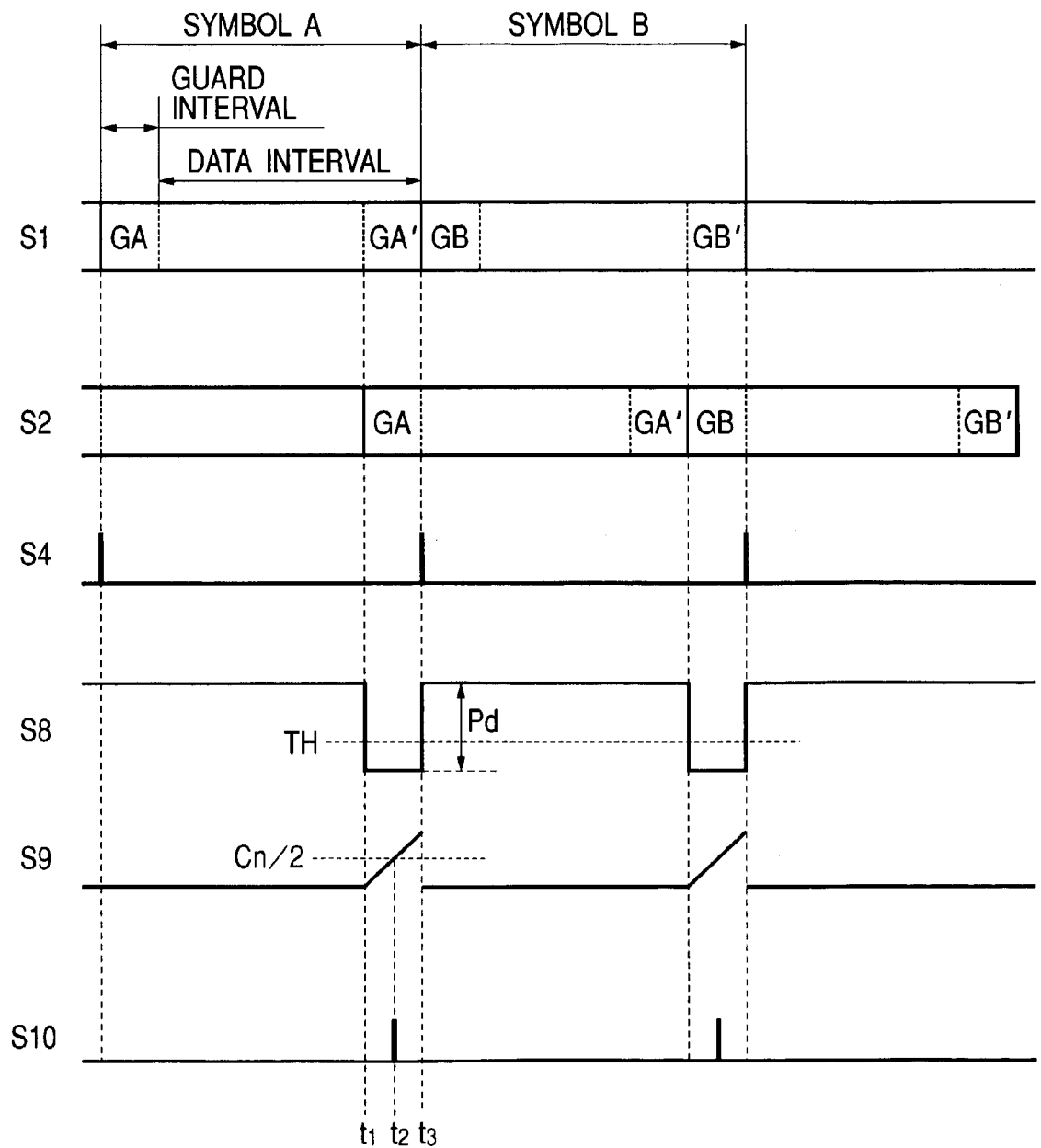
FIG. 4 is an explanatory drawing for explaining the operation of one embodiment shown in FIG. 1 of the present invention.

Referring to FIGS. 1 and 4, one embodiment of the invention will be described below. FIG. 1 is a block diagram showing the schematic configuration of one embodiment of the invention and FIG. 4 is an explanatory drawing for explaining the operation of the embodiment shown in FIG. 1. FIG. 1 shows a receiving apparatus of an OFDM modulated signal and as a transmitting apparatus of the OFDM modulated signal is similar to the transmitting apparatus shown in FIG. 6(a), the drawing and the description are omitted. In the following description of the present invention, the transmitting apparatus is omitted and the receiving apparatus will be described.

Figure 14:
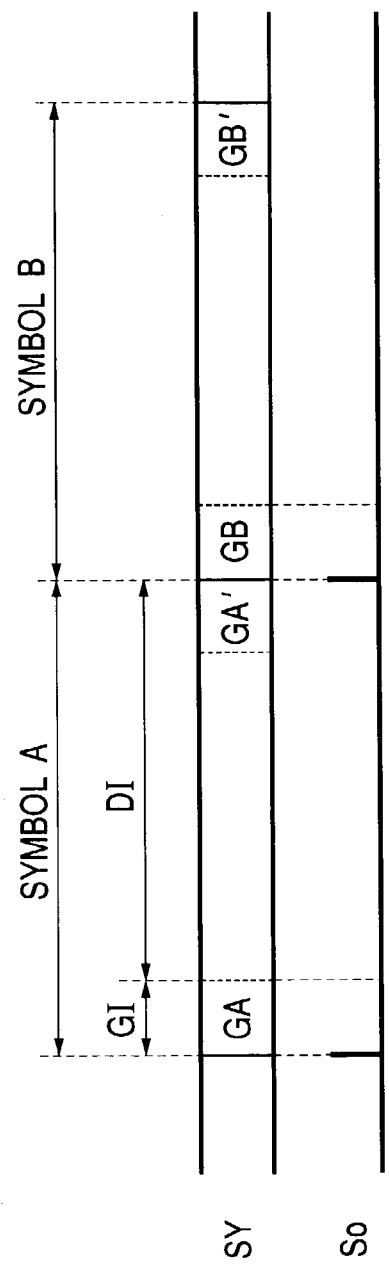
FIG. 14 is an explanatory drawing for explaining the schematic configuration of symbols of the OFDM modulation signal.

As shown in FIG. 1, a received signal received by an antenna 1 is converted to a base band signal by a down-converter 2 of the receiving apparatus and is input to an A/D converter 3. A digital received signal S1 shown in FIG. 7 is acquired from the A/D converter 3. The signal has the same configuration as a signal SY shown in FIG. 14. The digital received signal S1 is applied to a Fourier fast transformation (hereinafter abbreviated as FFT) arithmetic unit 4.

In the meantime, the digital received signal S1 is supplied to a delay unit 5 and a correlation calculating unit 6. In the delay unit 5, the digital received signal S1 is delayed by time equivalent to a data interval DI to be a digital signal S2 and is applied to the correlation calculating unit 6. In the correlation calculating unit 6, correlation between the digital received signal S1 and the delayed digital signal S2 is calculated.

As a result, for the output of the correlation calculating unit 6, correlation output S3 shown in FIG. 7 is acquired because the digital received signal S1 and the delayed signal S2 are the same signal as described above. The correlation signal S3 is output to a peak detector 7, the position of a peak is detected by the peak detector 7 and a correlation peak position signal S4 shown in FIG. 7 is output. The correlation calculating unit 6 and the peak detector 7 compose a peak detecting block 19. A symbol synchronous control block 20 applies the correlation peak position signal S4 to the A/D converter 3 via a clock signal controller 8, an integrator 9, a D/A converter 10 and a voltage controlled oscillator (VCO) 11 to execute the synchronous control of a symbol. The peak detecting block 19 and the symbol synchronous control block 20 are the same as the part described in relation to FIG. 6.

The digital received signal S1 output from the A/D converter 3 is also supplied to a differential value calculating unit 16. The differential value calculating unit 16 detects difference in a level between the digital received signal S1 and the delayed signal S2 delayed by the data interval DI and outputs it to an absolute value circuit 17. A differential absolute value signal calculated by the absolute value circuit 17 has a waveform shown as S8 in FIG. 4. A depression in the waveform of the differential absolute value signal S8 is equivalent to a part in which each guard interval of the digital received signal S1 and the delayed signal S2 is coincident. That is, as the digital received signal S1 and the delayed signal S2 delayed by the data interval are the same signal as described above, a differential absolute value between a part GA' of the digital received signal S1 and the guard interval GA of the delayed signal S2 is zero. In the meantime, as difference between signals in different symbols is detected in parts except these parts, a differential absolute value is at a predetermined level. Though the differential absolute value shown as S8 in FIG. 4 is drawn as a flat value, it is actually the absolute value of a differential signal between the signals S1 and S2.

The position of a leading edge of the differential absolute value signal S8, that is, a boundary position between symbols can be detected by inputting the differential absolute value signal S8 to a timing generator 18 and comparing it with a predetermined threshold TH. A timing generating block 21 is composed of a threshold decision circuit 15, the absolute value circuit 17 and the timing generator 18. A method of detecting a boundary position between symbols will be described later.

The threshold TH is experimentally set to a predetermined value according to setting in modulation technique and an error correction method. For example, as transmission is made under environment that carrier power-to-noise power ratio (C/N ratio) is 23 (dB) or more in case transmission is made according to 64 QAM technique and transmission is made under environment that C/N ratio is 13 (dB) or more in the case of QPSK modulation, it is desirable that the threshold TH is experimentally set every case.

The depression of the differential absolute value signal S8 depends upon the C/N ratio and the smaller the C/N ratio is, the shallower the depression is. Therefore, when a threshold is decided according to 64 QAM modulation technique for example, the differential absolute value signal S8 acquired in QPSK modulation technique may not reach the threshold TH.

Therefore, to avoid such a situation, in this embodiment, a signal according to the setting of modulation technique and an error correction method from a modulation mode setting unit 14 is input to the threshold decision circuit 15 and a threshold is varied according to a modulation mode there. For example, in 64 QAM modulation technique, the threshold TH is set to a value, 0.06×C equivalent to 25 dB equivalent to mean receive power C. In quadrature phase shift keying (QPSK), the threshold TH is set to a value, 0.22×C equivalent to 13 dB equivalent to mean receive power C.

The threshold TH decided as described above is input to the timing generator 18 and an FFT window position reference signal S10 is acquired as the output of the timing generator 18. The timing of the digital received signal S1 applied to the FFT arithmetic unit 4 is controlled by applying the FFT window position reference signal S10 to the FFT arithmetic unit 4 and the output is applied to a demodulation circuit 12.

In the meantime, the output of the modulation mode setting unit 14 is applied to the demodulation circuit 12 and a required demodulation mode heretofore known is set. As a result, the digital received signal S1 is correctly demodulated based upon the FFT window position reference signal S10. The demodulated digital signal is output from an output terminal 13 and in case signal processing is required, for example, in the case of a picture signal, required picture signal processing is executed and an image is displayed on a monitor (not shown) and others. It need scarcely be said that an image can be recorded on a thing except a monitor or can be transmitted to another place via a transmission line.

Figure 11:
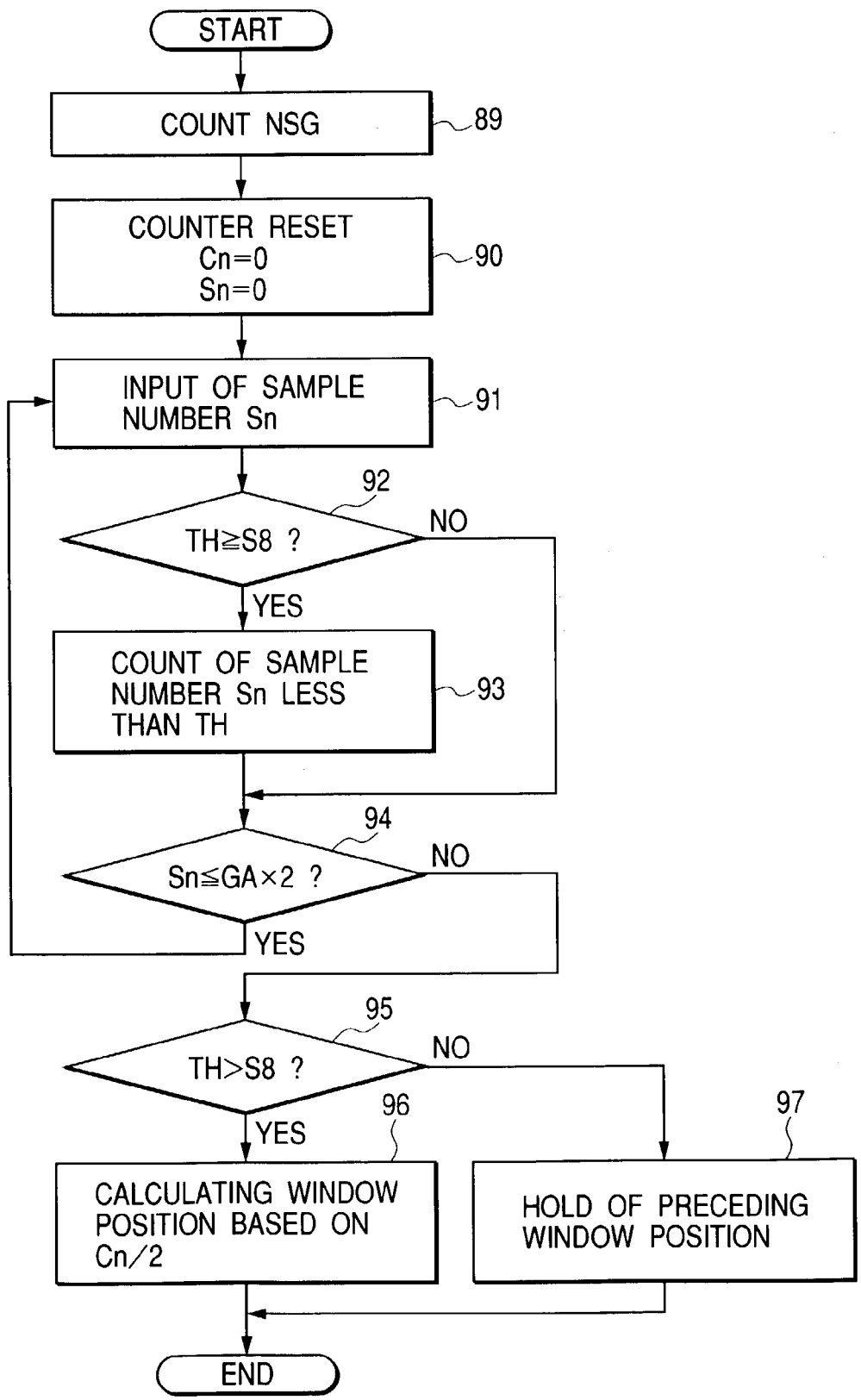
FIG. 11 is a flowchart for explaining the operation of a timing generator in one embodiment shown in FIG. 1 of the present invention.

Next, referring to a flowchart shown in FIG. 11, processing in the timing generator 18 will be described. The timing generator 18 is formed by a counter, for example. First, operation for calculating an FFT window position will be described. A correlation peak position signal S4 output from the peak detector 7 is detected and operation shown in FIG. 11 is started. That is, in a step 89, the number of NSG is counted from a pulse position of the correlation peak position signal S4 and a process proceeds a step 90. In this case, the number of NSG denotes a number acquired by subtracting the number (for example, 128) of samples in a guard interval from the number (for example, 1152) of samples in one symbol. That is, the number of NSG is equivalent to a trailing edge (time $t_1$) of the differential absolute value signal S8 shown in FIG. 4.

In the step 90, a count value Cn and the number of samples Sn are reset to zero. The count value Cn is reset every symbol. For example, the count value is reset to zero at the timing of the time $t_1$ shown in FIG. 4. The number of samples Sn denotes the number of samples composing each symbol as described above. For example, each symbol is composed of 1152 samples and a guard interval is composed of 128 samples.

In a step 91, the differential absolute value signal S8 is input and the count of the number of samples is started from the time $t_1$.

In a step 92, the differential absolute value signal 58 and the threshold TH are compared and in case the differential absolute value signal S8 is larger than the threshold TH, the process proceeds to a step 94. In the meantime, in case the differential absolute value signal S8 is equal to or smaller than the threshold TH, that is, from the time $t_1$ to time $t_3$ shown in FIG. 4, the process proceeds a step 93 and the count value Cn is increased.

Next, in the step 94, it is judged whether the number of samples Sn incorporated in the differential absolute value signal S8 exceeds the number (for example, 256) of double samples in the guard interval GA or not. In case the number of samples incorporated in the differential absolute value signal S8 does not exceed, the steps 91 to 94 are repeated and in case the number of samples incorporated in the differential absolute value signal exceeds, the process proceeds to a step 95. The output of the counter acquired in the step 94 is a signal S9 shown in FIG. 4.

In the step 95, it is judged whether a sample in which the differential absolute value signal S8 is smaller than the threshold TH exists or not, in case no sample exists, the process proceeds to a step 97, an FFT window position is not moved and the reference signal S10 in the FFT window position is output to the FFT arithmetic unit 4 shown in FIG. 1. That is, the preceding window position is adopted. In the meantime, in case a sample in which the differential absolute value signal S8 is smaller than the threshold TH exists, the process proceeds to a step 96 and a sample point showing a half value of a count value Cn is calculated. That is, time $t_2$ in the signal S10 shown in FIG. 4 is generated and the reference signal S10 in the FFT window position is output to the FFT arithmetic unit 4 at the time $t_2$ as the starting point of the FFT window position. As the time $t_2$ is located in the middle of the guard interval, a boundary between a symbol A and a symbol B can be correctly detected if the time $t_2$ is suitably delayed.

Next, referring to FIG. 5, one embodiment of the present invention in multipath propagation in which a main wave MW and a reflection wave DW are simultaneously received will be described.

Figure 5:
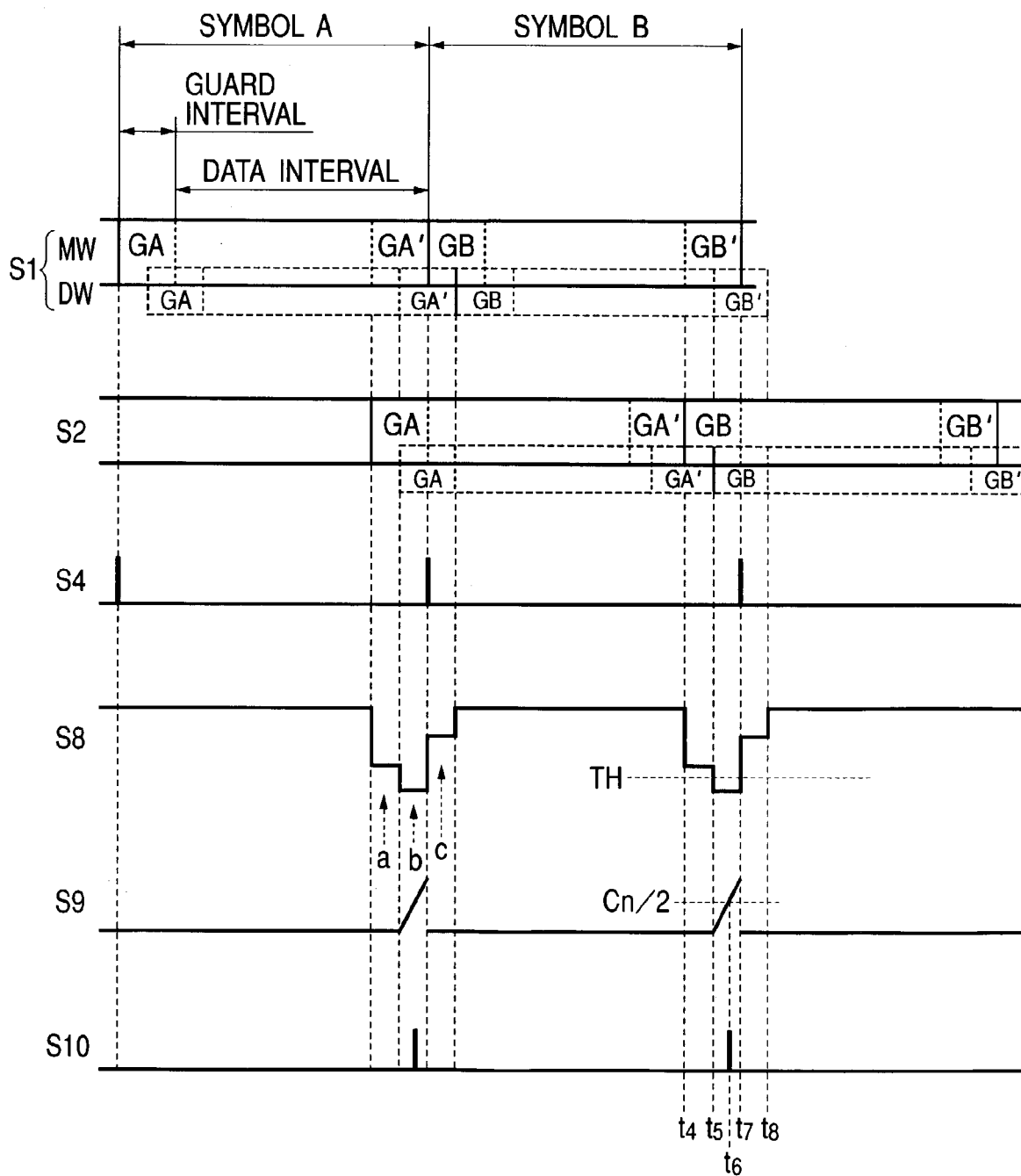
FIG. 5 is an explanatory drawing for explaining the operation of one embodiment shown in FIG. 1 of the present invention in multipath propagation.
Figure 10:
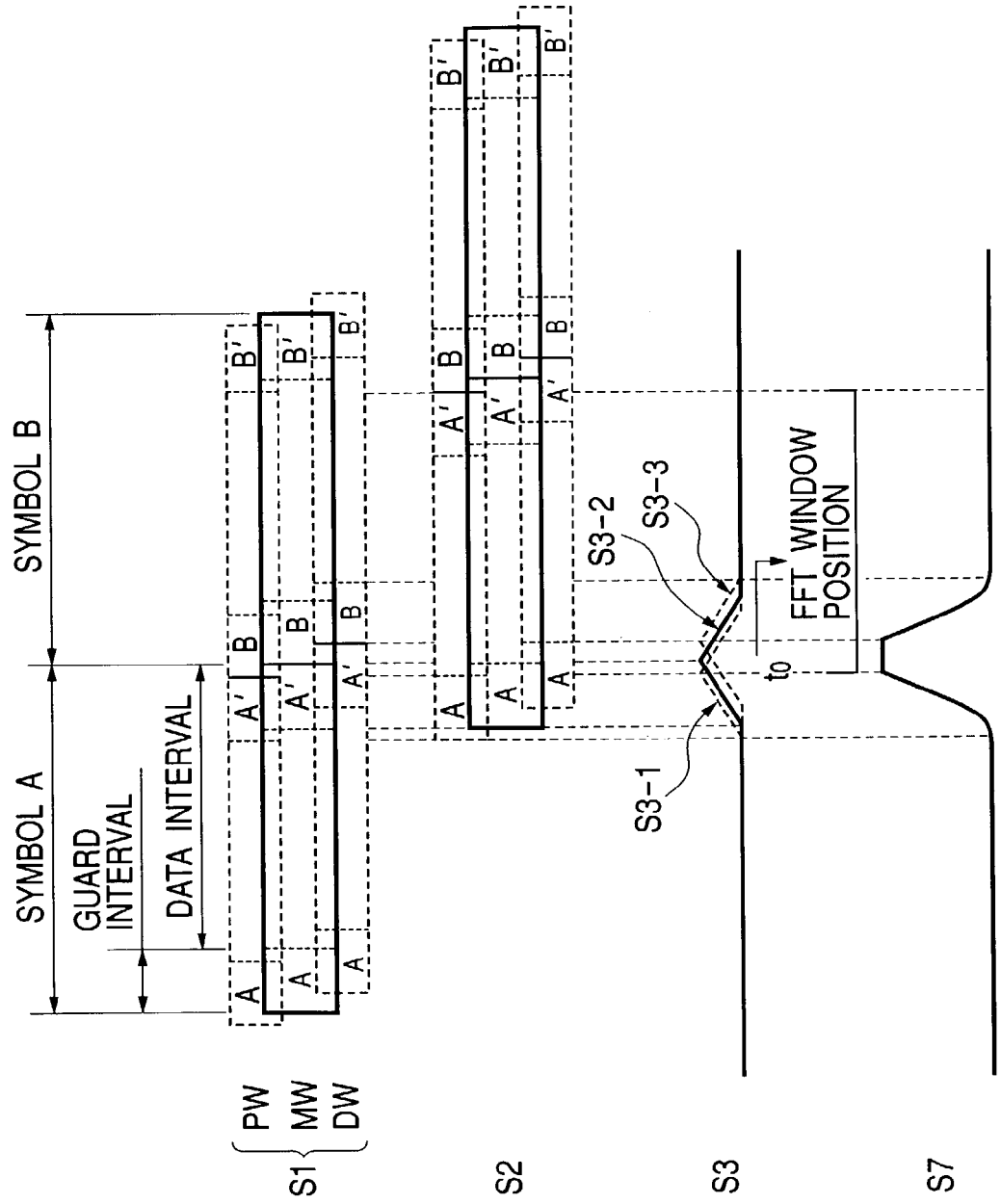
FIG. 10 is an explanatory drawing for explaining the operation of the conventional type in multipath propagation.

As a digital received signal S1 shown in FIG. 5, a digital signal including the main wave MW is shown by a full line and the reflection wave DW of the digital received signal S1 is shown by a dotted line. A received signal in which the main wave MW and the reflection wave DW are synthesized is input to the delay unit 5 and a signal delayed by a data interval DI of the received signal is a delayed signal S2 shown in FIG. 5. In FIG. 5, for the signals S1 and S2, only a part is shown, however, in respective actual signals, symbols are continuous.

The digital received signal S1 and the delayed signal S2 are input to the differential value calculating unit 16 and a differential value is calculated. The result of the calculation is input to the absolute value circuit 17 and a waveform of an acquired differential absolute value signal is S8 shown in FIG. 5. In this case, a depression of a differential output waveform is irregular, compared with the signal S8 shown in FIG. 4 including no reflection wave.

That is, at a point a of the signal S8 shown in FIG. 5, as the reflection wave DW at a lower level and a signal in a corresponding part of the reflection wave DW of the delayed signal S2 are different though a part GA' of the main wave MW and a part GA of the delayed signal S2 of the main wave MW are the same signal, a depression acquired by the calculation of a differential value is reduced by the quantity. At a point b shown in FIG. 5, the part GA' of the digital received signal S1 of the main wave MW and the part GA of the delayed signal S2 of the main wave MW are also the same signal. Further, a part GA' of the reflection wave DW of the digital received signal S1 and the part GA of the reflection wave DW of the delayed signal S2 are also the same signal. Therefore, a differential absolute value between these parts is zero and a depression acquired as a result of the calculation of a differential value is the deepest. Further, at a point c shown in FIG. 5, as the digital received signal S1 of the main wave MW at a higher level and a corresponding part of the delayed signal S2 of the main wave MW are signals of different symbols though the part GA' of the reference wave DW of the digital signal S1 and the part GA of the reflection wave DW of the delayed signal S2 are the same signal, a depression acquired as a result of the calculation of a differential value is reduced by the quantity.

The differential absolute value signal S8 shown in FIG. 5 is input to the timing generator 18, and the differential absolute value signal S8 and a predetermined threshold TH input from the threshold decision circuit 15 to the timing generator 18 are compared. In the timing generator 18, processing described above and shown in FIG. 11 is executed. For example, when the threshold TH is set in a position shown in S8 in FIG. 5, the value Cn of a counter for counting the number Sn of samples equal to or smaller than the threshold of the differential absolute value signal S8 has a waveform of a signal shown as S9 in FIG. 5. That is, as the differential absolute value signal S8 is larger than the set threshold TH though a depression exists between time $t_4$ and time $t_5$, the count value is unchanged.

As the threshold TH is larger than the differential absolute value signal S8 between time $t_5$ and time $t_7$, the count value Cn increases. As the threshold TH is smaller than the differential absolute value signal S8 after time $t_7$, the count value is unchanged. A reference signal of an FFT window position is detected based upon the count value Cn. That is, a half of the count value Cn is equivalent to time $t_6$ in a signal shown as S10 in FIG. 5.

For a method of deciding an FFT window position in the timing generator 18, the position of a leading edge of the differential absolute value signal S8 detected in the absolute value circuit 17 may be also used for an FFT window position as it is. However, normal transmission is basically made within a line-of-sight range, a main wave MW is first received and its receive electric field is also large. Therefore, as over horizon propagation turns into line-of-sight propagation sometime even if the line-of-sight propagation turns into the over horizon propagation in case mobile transmission in which a transmitter moves is made, it is desirable that for an FFT window position, a detected position of a main wave MW is held. Therefore, it is desirable that when a main wave the receive electric field of which is large is received, an FFT window position is promptly moved to a detected position of the main wave and in case only a reflection wave the receive electric field of which is large is received, the FFT window position is slowly moved to a detected position of the reflection wave.

Concretely, suppose that a FFT window position in a preceding symbol is W and an FFT window position of the current symbol is set in front by m samples off the FFT window position of all symbols. In this case, to detect a main wave, the FFT window position is moved so that the FFT window position W' of the current symbol becomes a following equation.

$$W'=W+m \qquad (1)$$

In the meantime, suppose that in case a reflection wave in which the FFT window position of the current symbol is set backward off the FFT window positions W detected in all symbols is detected, the detection frequency of reflection waves the receive electric field of which is large is n times. In this case, the FFT window position is moved so that the FFT window position W' of the current symbol becomes a following equation.

$$W'=W-(1/100) \times n \qquad (2).$$

"1/100" in the above equation (2) is inserted to control the movement of the FFT window position. The equation (2) is an example that if reflection waves are detected a hundred times, the FFT window position is moved by one sample, however, the numeral is not limited to 1/100. The value is experimentally decided in view of a situation of a receive electric field.

Further, for the detection frequency n of reflection waves, a count value Cn is reset to zero every time a preceding main wave is detected and the quantity of the movement of an FFT window position for reflection waves can be also controlled.

Figure 2:
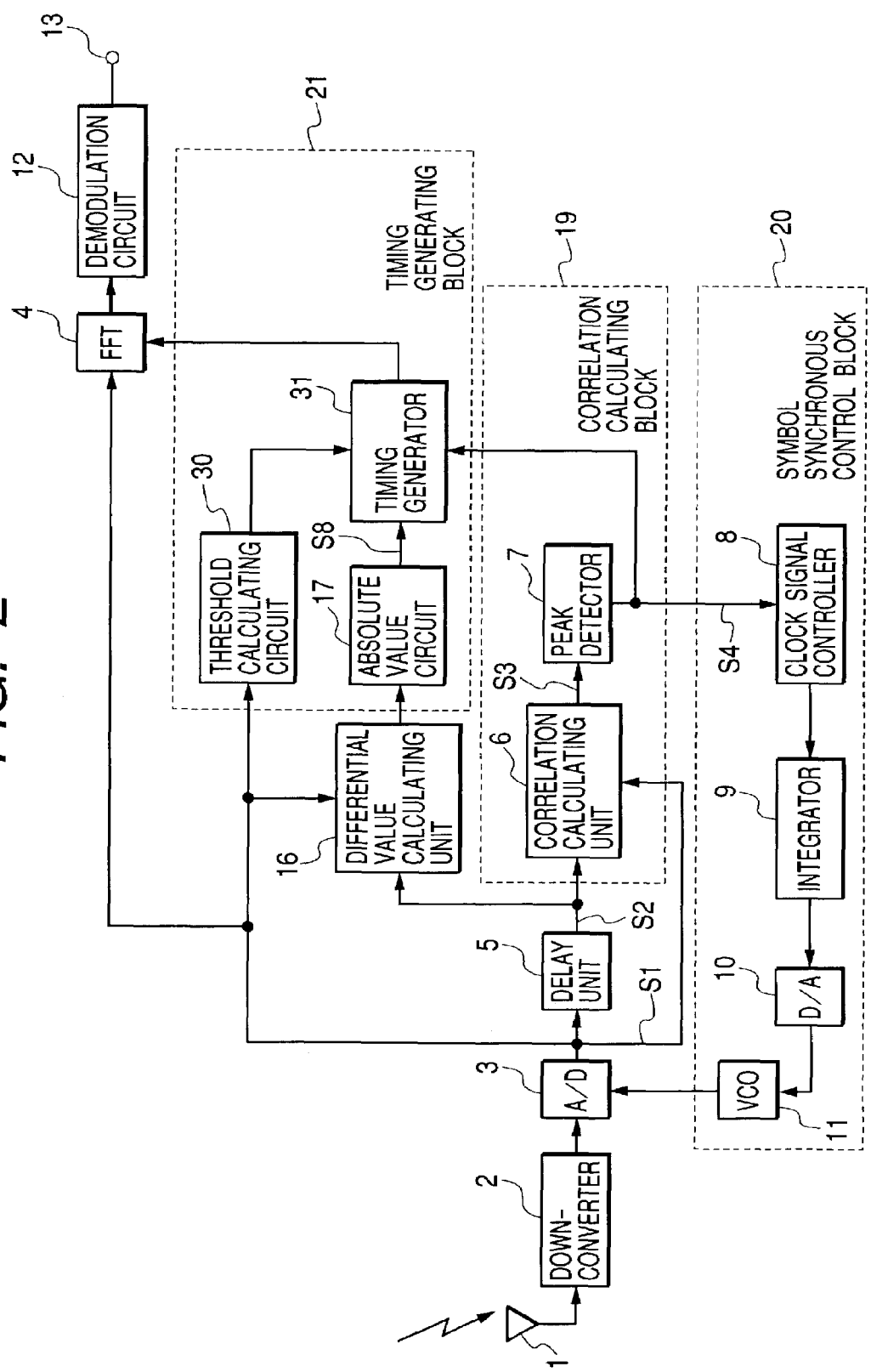
FIG. 2 is a block diagram showing the schematic configuration of another embodiment of the present invention.

FIG. 2 is a block diagram showing the schematic configuration of another embodiment of the present invention. In FIG. 2, the same reference number is allocated to the same as in FIG. 1. A reference number 30 denotes a threshold calculating circuit and it is different from the threshold decision circuit 15 shown in FIG. 1. A reference number 31 denotes a timing generator and it can be also formed by a counter as the timing generator 18 shown in FIG. 1, however, in this embodiment, a case that the timing generator 31 is formed by a comparing circuit with a threshold TH will be described. A digital received signal S1 is input to the threshold calculating circuit 30. In the threshold calculating circuit 30, the power value of the digital received signal S1 is calculated and a threshold TH is calculated based upon the power value. The threshold TH is used to detect the position of a leading edge of a differential absolute value signal S8 output from a differential absolute value circuit 17. That is, the calculated threshold TH and the differential absolute value signal S8 output from the absolute value circuit 17 are input to the timing generator 31 and the position of the leading edge of the differential absolute value signal S8 shown in FIG. 4 is detected there.

The timing generator 31 generates a reference signal S10 of an FFT window position showing a boundary between symbols-based upon the detected position of the leading edge. A method of generating the reference signal S10 of the FFT window position will be described later. The threshold TH calculated in the threshold calculating circuit 30 can be also acquired based upon the depth of a concave portion of the differential absolute value signal S8, that is, the result of the detection of a noise level in addition to the calculation based upon the power value of the digital received signal S1 as described above. For example, if a signal level of the digital received signal S1 is S and a coefficient according to a modulation mode is α, the threshold is acquired as follows. In this embodiment, as the modulation mode setting unit 19 shown in FIG. 1 is not provided, the coefficient α is decided based upon experiment data in the case of receiving in a predetermined modulation mode and others.

$$TH=S \cdot \alpha \qquad (3)$$

The depth of the concave portion of the differential absolute value signal S8 varies depending upon a condition of receiving. Therefore, the threshold TH acquired in the expression (3) may be smaller than the depression of the differential absolute value signal S8. Therefore, if the depth of the concave portion of the differential absolute value signal S8 is pd and an offset value is β, the threshold TH is corrected in the following expression. TH' denotes a corrected threshold. The offset value β is experimentally decided.

$$TH'=TH+\beta (\text{when } TH \leq pd) \qquad (4)$$

Figure 12:
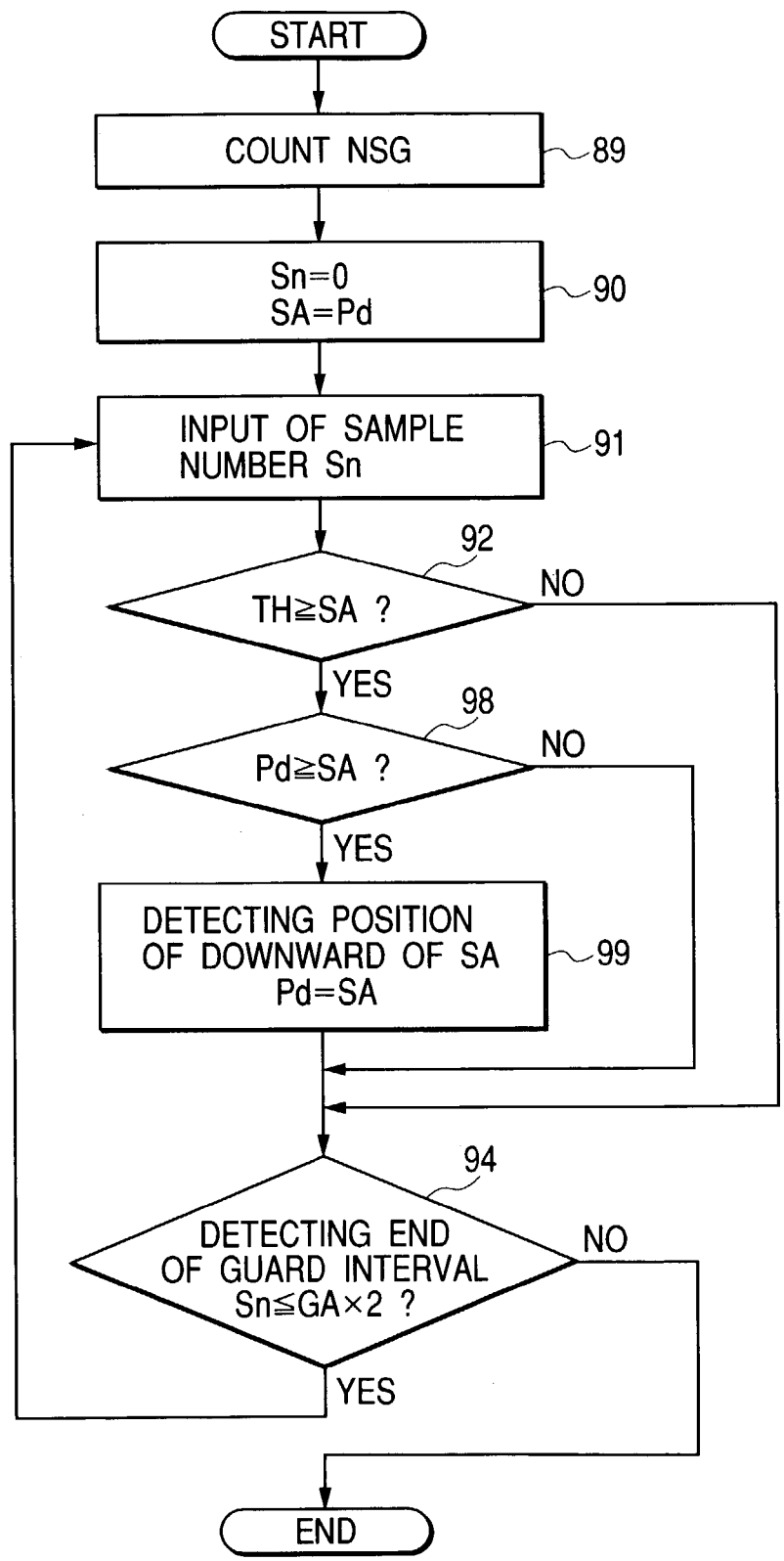
FIG. 12 is a flowchart for explaining the operation of a timing generator in another embodiment shown in FIG. 2 of the present invention.
Figure 13:
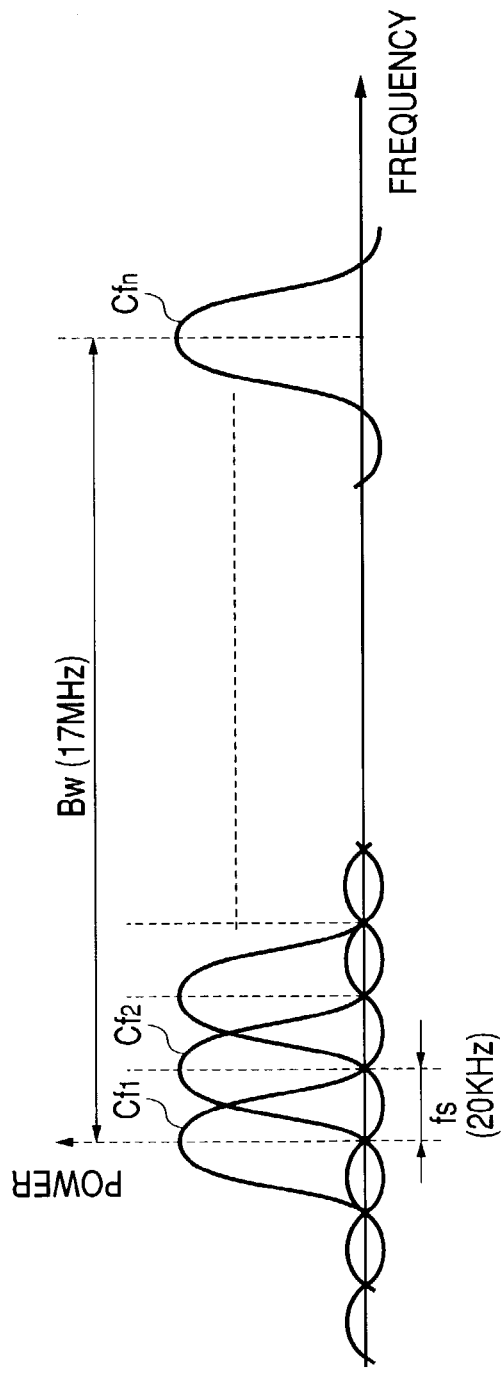
FIG. 13 shows a schematic waveform of an OFDM modulation signal.

Next, referring to FIG. 12, the operation of the timing generator 31 will be described. Suppose that the count value of samples in the differential absolute value signal S8 incorporated in the timing generator 31 is Cn and a value of a differential absolute value signal in an FFT window position is SA.

In a step 89, as in the step 89 shown in FIG. 11, a trailing edge (time $t_1$) of the differential absolute value signal S8 is detected.

In a step 90, Sn and Pd are reset every symbol. That is, a sample value Sn is zero and a value SA of a differential absolute value signal is the maximum amplitude (the depth) Pd (shown in S8 in FIG. 4) of the signal S8.

In a step 91, the differential absolute value signal is input from the absolute value circuit 17 to the timing generator 31 by one sample. In a step 92, a value SA of the differential absolute value signal and its threshold TH are compared every sample. In case the value SA of the differential absolute value signal is larger than the threshold TH, a process proceeds to a step 94 and in the other case, the process proceeds to a step 98.

In the step 98, a value Pd of the differential absolute value signal in an FFT window position and a value SA of a differential absolute value signal of the currently input sample are compared. As a result, in case the current differential absolute value signal SA is equal to or smaller than Pd, the process proceeds to a step 99 and the position of the final trailing edge of the value SA of the differential absolute value signal is detected. In case the current differential absolute value signal SA is larger than Pd, the process proceeds to the step 94. In the step 94, the termination position of a guard interval, that is, the position of a trailing edge of the differential absolute value signal S8 can be detected and the position of the trailing edge becomes an FFT window position.

Figure 3:
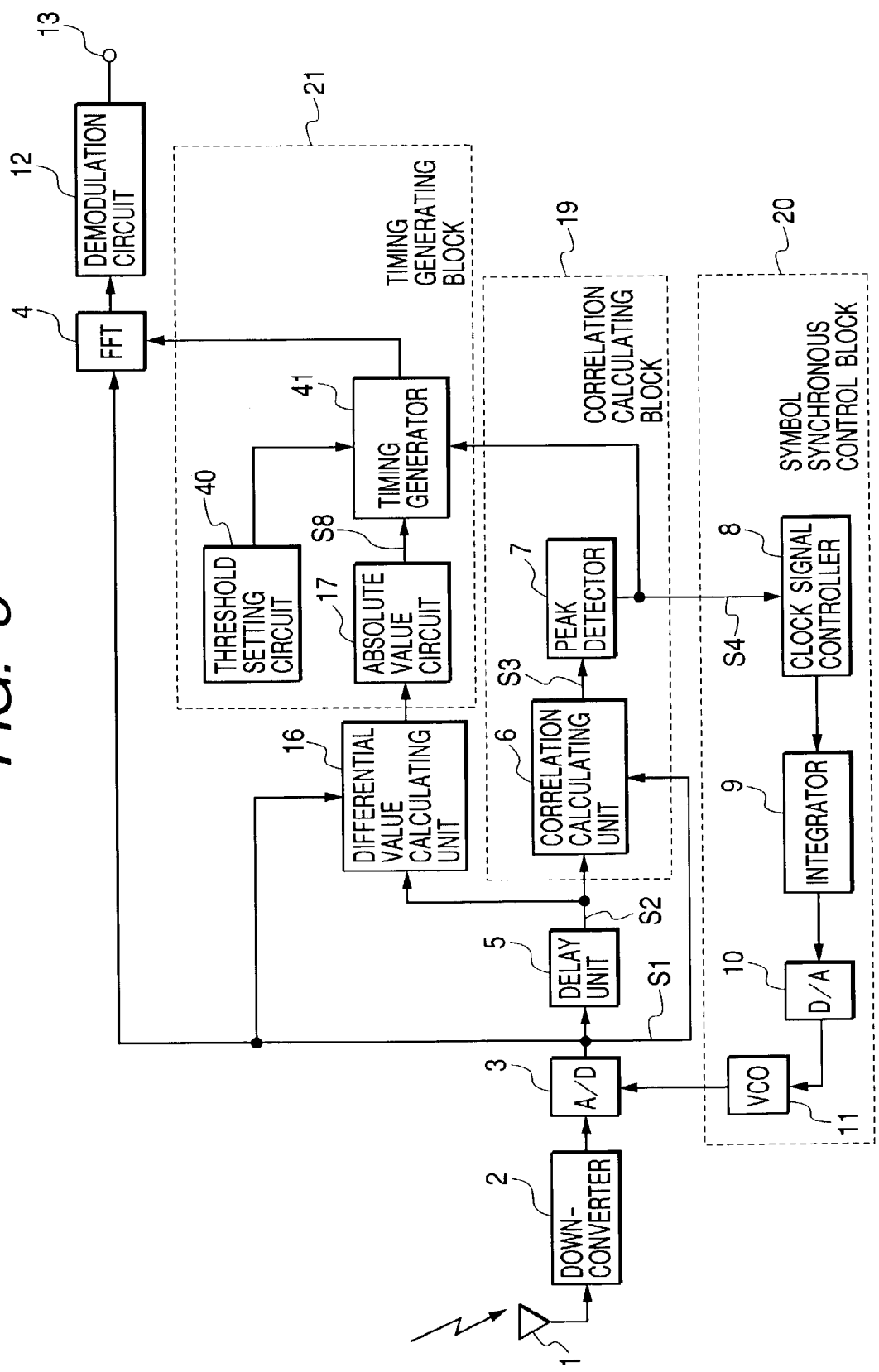
FIG. 3 is a block diagram showing the schematic configuration of further another embodiment of the present invention.

FIG. 3 is a block diagram showing the schematic configuration of further another embodiment of the invention. In FIG. 3, the same reference number is allocated to the same as in FIG. 1. A reference number 40 denotes a threshold setting circuit and 41 denotes a timing generating circuit.

The threshold setting circuit 40 is a circuit for setting a predetermined threshold TH in this embodiment and is mainly manually set. For a setting method, for example, a threshold TH may be also manually set, watching an image displayed on a monitor or may be also experimentally decided. The timing generator 41 can be realized by the counter-type timing generator 18 shown in FIG. 1 or the comparator-type timing generator 31 shown in FIG. 2, however, as the details are already described, the description is omitted here.

As described above, there is the problem that as a correlation waveform to be calculated is distorted every symbol depending upon the contents of transmitted data in the case of a receiving apparatus according to OFDM in which symbol synchronization is detected according to a guard correlation method and a boundary between symbols is determined based upon the result, a detected correlation peak position disperses and the position of the boundary between the symbols is displaced.

However, according to the present invention, a boundary between symbols can be stably detected without depending upon the displacement of the correlation peak position and the precision of demodulation is enhanced.

When a range of timing for incorporating data in the FFT calculating unit is set in the extreme vicinity of a boundary between symbols, the data of the next symbol is incorporated together with demodulation data when displacement and a preceding wave occur as a result of the detection of the boundary between symbols. Also in case a position in which demodulation data is incorporated is set in the vicinity of the head of a symbol, interference between symbols is caused by a delayed wave and modulation is disabled.

Even in such a case, according to the invention, as interference between symbols caused by a preceding wave and a delayed wave is avoided and a position for incorporating demodulation data for FFT calculation can be decided, the correct demodulation of a digital signal can be realized without being influenced by the preceding wave and the delayed wave. In the invention, the transmission system of an OFDM modulated signal and the method of demodulating the OFDM modulated signal have been concretely described above, however, it need scarcely be said that technique according to the invention can be widely used for the transmission and the demodulation of a signal having a guard interval except the OFDM modulated signal.

It will be appreciated while particular embodiments of the present invention have been shown and described, modifications may be made. It is intended in the claims to cover all modifications which come within the true spirit and scope of the invention.

What is claimed is:

1. A demodulation method for demodulating a transmission signal having a plurality of symbols which are repetition signals, each of which has a guard interval and a data interval and each symbol having a same term, comprising the steps of:
   receiving said transmission signal;
   fetching said data interval of said symbols from said received transmission signal in accordance with a Fourier Fast Transformation (FFT) window;
   delaying said received transmission signal by said data interval;
   calculating a difference between said received transmission signal and said delayed transmission signal;
   detecting a reference position of said FFT window in each of said received symbols of said received transmission signal based upon the result of the calculation of said difference;
   controlling the position of said FFT window for fetching said data interval of said received transmission signal in order to demodulate said data interval based upon said detected reference position of said FFT window; and
   demodulating said received transmission signal being obtained in the step of fetching said data interval.

2. A demodulation method according to claim 1, wherein the step for detecting said reference position of said FFT window in each of said received symbols of said received transmission signal based upon the result of the calculation of said difference comprises the steps of generating a predetermined threshold and generating a reference signal based upon the result of the calculation of said difference and said predetermined threshold.

3. A demodulation method according to claim 2, further comprising the step of:
   setting a type of the modulation of said transmission signal,
   wherein said predetermined threshold is controlled based upon said modulation type.

4. A demodulation method according to claim 3, wherein said predetermined threshold is set to a value according to at least either one of said modulation type and an error correction method used for said transmission signal.

5. A demodulation method according to claim 2, wherein said predetermined threshold is set to a value calculated based upon the received signal.

6. A demodulation method according to claim 2, wherein said transmission signal includes a main wave and a reflection wave; and
   if said reference position of said FFT window detected in a preceding symbol is W, the quantity of displacement between said reference position W and a reference position of said main wave detected in a current symbol is m, the detection frequency of said reflection wave is n and a constant of the control of the position of said FFT window is K, the position of said FFT window is so controlled that said reference position W' of the current symbol is "W+m" when said main wave is detected and the position of said FFT window is so controlled that said reference position W' of said current symbol is "W−n/K" when said reflection wave is detected.

7. A demodulation method according to claim 1, wherein said transmission signal is an OFDM modulated signal.

8. A receiving apparatus for receiving a transmission signal having a plurality of symbols which are repetition signals, each of which has a guard interval and a data interval and each symbol having a same term, comprising:
   a receiving unit for receiving said transmission signal;
   a Fourier Fast Transformation (FFT) arithmetic unit having a FFT window for fetching said data interval from said transmission signal to which said received transmission signal from said receiving unit is applied;
   a delay unit for delaying said received transmission signal from said receiving unit by said data interval;
   a differential value calculating unit for calculating a difference between said received transmission signals from said receiving unit and said delayed transmission signal from said delay unit;
   a guard interval reference position detecting unit for detecting a reference position of said FFT window in each of said received symbols of said received transmission signal based upon the result of the calculation of said difference in said differential value calculating unit, said reference position of said FFT window from which controls a position of said FFT window for fetching said data interval of said received transmission signal in order to demodulate said data interval; and a demodulating unit, coupled with said FFT arithmetic unit, for demodulating said transmission signal.

9. A receiving apparatus according to claim 8, wherein:
said guard interval reference position detecting unit comprises a threshold generator for generating a predetermined threshold and a reference signal generator for generating a reference signal based upon the result of the calculation between said difference and said predetermined threshold.

10. A receiving apparatus according to claim 9, further comprising:
a type setting unit for setting a type of the modulation of said transmission signal,
wherein said predetermined threshold is controlled based upon the output of said type setting unit.

11. A receiving apparatus according to claim 10, wherein the output of said type setting unit is controlled according to at least either one of said modulation type and an error correction method used for said transmission signal.

12. A receiving apparatus according to claim 9, wherein said threshold generator receives said transmission signal and generates said predetermined threshold calculated based upon said transmission signal.

13. A receiving apparatus according to claim 9, wherein:
said transmission signal includes a main wave and a reflection wave, and
wherein said FFT arithmetic unit is so designed that if said reference position of said FFT window detected in a preceding symbol is W, the quantity of displacement between said reference position W and a reference position of said main wave detected in a current symbol is m, the detection frequency of said reflection wave is n and a constant of the control of the position of said FFT window is K, the position of said FFT window is so controlled that said reference position W' of said current symbol is "W+m" when said main wave is detected and the position of said FFT window is so controlled that the reference position W' of said current symbol is "W−n/K" when said reflection wave is detected.

14. A receiving apparatus according to claim 8, wherein said transmission signal is an OFDM modulated signal.

15. A signal transmission system comprising:
a transmitting apparatus; and
a receiving apparatus,
wherein said transmitting apparatus, for transmitting a transmission signal having a plurality of symbols which are repetition signal, each of which has a guard interval and a data interval and each symbol having a same term, comprises:
a modulating unit for modulating said transmission signal according to predetermined modulation technique,
a guard interval inserting unit for inserting said guard interval into a modulated signal from said modulating unit so as to generate said transmission signal made by the repetition signals of a plurality of symbols, each of which has said guard interval and said data interval, and
an antenna for transmitting the output of said guard interval inserting unit; and
wherein said receiving apparatus comprises:
a receiving unit for receiving said transmission signal,
a Fourier Fast Transformation (FFT) arithmetic unit having a FFT window for fetching said data interval of each of said symbols from said received transmission signal, to which said received transmission signal from said receiving unit is applied,
a delay unit for delaying said received transmission signal from said receiving unit by said data interval,
a differential value calculating unit for calculating a difference between said received transmission signals from said receiving unit and said delayed transmission signal from said delay unit,
a guard interval reference position detecting unit for detecting a reference position of said FFT window in each of said symbols of said received transmission signal based upon the result of the calculation of said difference in said differential value calculating unit, said reference position of said FFT window from which controls a position of said FFT window for fetching said data interval of said received transmission signal in order to demodulate said data interval, and
a demodulating unit, coupled with said FFT arithmetic unit, for demodulating said transmission signal.

16. A signal transmission system according to claim 15, wherein said guard interval reference position detecting unit comprises:
a threshold generator for generating a predetermined threshold and a reference signal generator for generating a reference signal based upon the result of the calculation between said difference and said predetermined threshold.

17. A signal transmission system according to claim 16, wherein said receiving apparatus further comprises:
a type setting unit for setting a type of the modulation of said transmission signal,
wherein said predetermined threshold is controlled based upon the output of said type setting unit.

18. A signal transmission system according to claim 17, wherein the output of said type setting unit is output according to at least either one of said modulation type and an error correction method used for the transmission signal.

19. A signal transmission system according to claim 16, wherein said threshold generator receives said transmission signal and generates said predetermined threshold calculated based upon said transmission signal.

20. A signal transmission system according to claim 15, wherein said transmission signal is an OFDM modulated signal.

* * * * *